June 11, 1957 W. E. LARGE 2,795,737
PHOTOELECTRIC CONTROL CIRCUIT
Filed Jan. 28, 1954
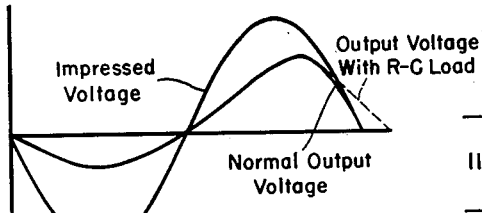
Fig. 1.
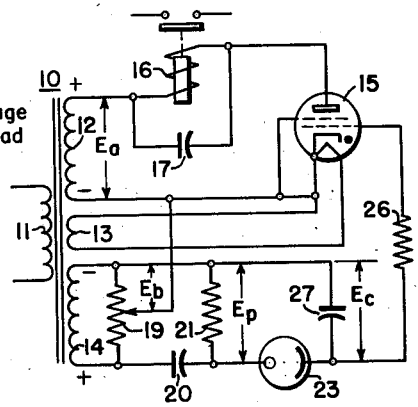
Fig. 2.
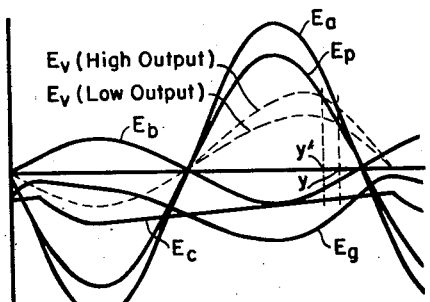
Fig. 3.
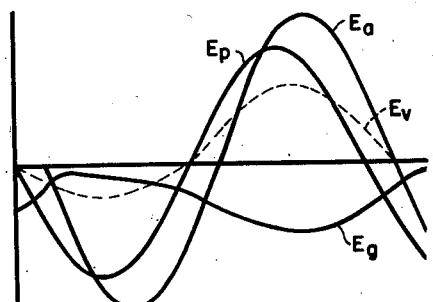
Fig. 4.
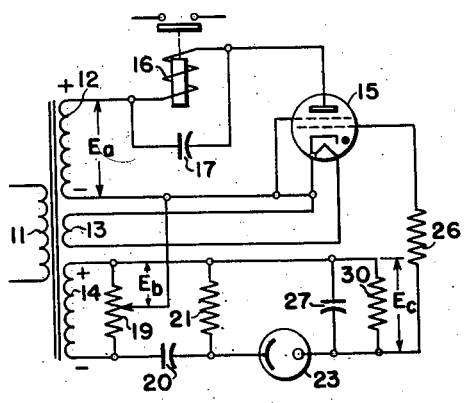
Fig. 5.
Fig. 6.
WITNESSES
Edwin E. Bassler
Leon M. Garman
INVENTOR
William E. Large
BY
Paul E. Friedmann
ATTORNEY

United States Patent Office 2,795,737
Patented June 11, 1957

2,795,737

PHOTOELECTRIC CONTROL CIRCUIT

William E. Large, Lancaster, N. Y., assignor to Westinghouse Electric Corporation, East Pittsburgh, Pa., a corporation of Pennsylvania Application January 28, 1954, Serial No. 406,705

7 Claims. (Cl. 315—156)

This invention relates to phototube control circuits, and relates more particularly to circuits in which gaseous phototubes are used to control thyratrons.

A gaseous phototube operated on alternating current, has, as a result of the gas ionization lag, a much lower impedance during the last portion of a positive half-cycle voltage applied to its anode, than during the first portion of the same half-cycle. I have found that by using a capacitor-resistor network for the load of such a phototube, its output voltage can be extended so that it exists after its anode voltage becomes zero, and that this permits the phototube output voltage to be phase-shifted ahead of the anode voltage of a thyratron it controls, while maintaining control of the thyratron during the same portions of the positive half-cycles as would be maintained if there was no such phase-shifting.

In one embodiment of this invention in which a control relay is energized by the firing of a thyratron when light is applied to a gaseous phototube, the phototube and thyratron are operated on alternating current, with the control grid of the thyratron biased negatively by the sum of negative half-cycle voltages out-of-phase with the thyratron anode voltage, and of negative charges in a bias capacitor connected between the control grid of the thyratron and the phototube. The output voltage resulting from the application of light to the phototube is phase-shifted ahead of the thyratron anode voltage so that its maximum value occurs near the normal firing point of the thyratron, and is applied to the control grid of the thyratron where it overcomes the bias voltage, causing the thyratron to fire early in the positive half-cycles and to energize a relay connected in its anode circuit. By such phase-shifting, the sensitivity of the circuit and its stability are greatly increased.

In another embodiment of this invention in which a control relay is energized during the absence of light on a phototube, a thyratron is biased normally to conduct by the sum of positive half-wave voltages in phase with its anode voltage, and negative charges in a bias capacitor connected between the control grid of the thyratron and the phototube. When light is applied to the phototube, it applies negative output voltage to the control grid of the thyratron, which voltage is phase-shifted ahead of the thyratron anode voltage so that it assumes control of the thyratron at the beginnings of the positive half-cycles by overcoming the normal bias voltage at such times, and preventing the thyratron from starting to conduct during all or substantially all of each positive half-cycle.

An object of this invention is to increase the sensitivity of phototube control circuits.

Another object of this invention is to extend the output voltage of a gaseous phototube in one direction while phase-shifting the output voltage in the opposite direction.

Another object of this invention is to phase-shift the output voltage of a gaseous phototube used to control a thyratron, ahead of the thyratron anode voltage while extending the output voltage in the other direction for maintaining control of the thyratron during substantially all of each positive half-cycle.

Another object of this invention is to phase-shift the output voltage of a gaseous phototube used to cause a thyratron to conduct when light is applied to the phototube, ahead of the thyratron anode voltage, so that the maximum value of the output voltage occurs near the normal firing point of the thyratron, while extending the output voltage in the other direction for maintaining control of the thyratron during substantially all of each positive half cycle.

Another object of this invention is to phase-shift the negative output voltage of a gaseous phototube used to cause a normally conducting thyratron not to conduct when light is applied to the phototube, ahead of the thyratron positive anode voltage during positive half-cycles, so that the negative output voltage prevents the thyratron from starting to conduct at the beginnings of the positive half-cycles, while extending the output voltage in the opposite direction for preventing the thyratron from starting to conduct during the late portions of the positive half-cycles.

This invention will now be described with reference to the drawings, of which:

Figure 1 is a plot of curves showing how the output voltage of a gaseous phototube can be extended after its anode voltage has become zero;

Fig. 2 is a circuit schematic of one embodiment of this invention in which a control relay is energized when light is applied to a gaseous phototube;

Fig. 3 is a plot of the wave forms and polarities in the circuit of Fig. 2, with no phase shift of the phototube voltages;

Fig. 4 is a plot of curves showing the phototube voltages phase-shifted ahead of the anode voltage of the thyratron;

Fig. 5 is a circuit schematic of another embodiment of the invention in which a control relay is energized when no light is applied to a phototube, and is deenergized when light is applied to the phototube, and Fig. 6 is a plot of curves showing the wave forms and polarities of the voltages in the circuit of Fig. 5.

Referring first to Fig. 1 of the drawings, normally the output voltage of a gaseous phototube is zero when its anode voltage is zero as shown by the solid line portions of the curves of Fig. 1. When an R.-C. network is connected to the output circuit of the phototube, its output voltage is extended, as illustrated by the dashed lines of Fig. 1, beyond the zero point of anode voltage at the end of each positive half-cycle.

Referring now to Fig. 2 of the drawings, a supply transformer 10 has a primary winding 11 for connection to an alternating current source, and has the secondary windings 12, 13 and 14. The winding 12 is connected at one end to the cathode, screen grid and filament of the thyratron 15. Its other end is connected in series with the control relay 16, which is shunted by the capacitor 17, to the anode of the thyratron. The winding 13 is connected across the filament of the thyratron 15.

The winding 14 has a potentiometer 19 connected thereacross, and has a phase-shift network consisting of the capacitor 20 in series with a resistor 21, connected thereacross. The slider of the potentiometer 19 is connected to the cathode of the thyratron 15.

The anode of a gaseous phototube 23 is connected to the junction point connection of the capacitor 20 and resistor 21. The cathode of the phototube is connected through the grid resistor 26 to the control grid of the thyratron 15, and in series with the load and bias capacitor 27 to the end of the winding 14 which is connected to the resistor 21.

The capacitor 17 which is used to prevent chattering of the contacts of the relay 16, may have a value of 1.0 mfd. The potentiometer 19 may have a value of 5,000 ohms, and is used to vary the sensitivity of the circuit by varying the value of the bias voltage applied to the control grid of the thyratron 15. The resistor 21 may have a value of 100,000 ohms. The capacitor 20 may have a value of .01 mfd. The capacitor 27 may have a value of .0005 mfd. The resistor 26 may have a value of 3.3 megohms. The capacitor 27 and resistor 26 are used to extend the output voltage of the phototube beyond its anode voltage at the ends of the positive half-cycles.

The out-of-phase bias voltage $E_b$ is supplied from the secondary winding 14, and is varied by adjustment of the potentiometer 19. The capacitor 27 is charged by grid rectification during the negative half-cycles, and retains the charge except for a slight leakage during the positive half-cycles, and provides a bias voltage $E_c$. The bias voltage $E_g$ on the control grid of the thyratron is the sum of $E_b$ and $E_c$.

When there is no light on the phototube, its impedance is high, and insufficient voltage from the winding 14 will be supplied through the phototube during positive half-cycles, to overcome the bias voltage at the thyratron grid.

When light is applied to the phototube, its impedance decreases and its output voltage $E_v$ increases. With no phase shift of the phototube input and output voltages, the thyratron would start conducting at the point $y$ on Fig. 3, late in the positive half-cycles, and would conduct earlier in the positive half-cycles, as at point $y'$, as the phototube output is increased. This results in sloppy pull-in of the relay 16 which is energized by the flow of anode current when the thyratron conducts, and in the requirement of relatively large output voltage from the phototube to cause the thyratron to conduct early in the positive half-cycles.

When the phototube voltages are phase-shifted ahead of the thyratron anode voltage as illustrated by Fig. 4, the maximum value of the phototube output voltage occurs early in the positive half-cycles near the normal firing point of the thyratron. Less phototube output voltage is required to fire the thyratron. The circuit of Fig. 2 has at least twice the sensitivity, as measured in operating distance for a given light intensity, as the usual phototube control circuit using a single thyratron.

Although the phototube output voltage is shifted ahead of the thyratron anode voltage, the resistor 26 and capacitor 27 cause this output voltage to exist later during the positive half-cycles than if they were not used, resulting in control of the thyratron during substantially the entire portion of each positive half-cycle.

In the embodiment of the invention illustrated by Fig. 5 of the drawings, a control relay is energized when no light is applied to a phototube, and is deenergized when light is applied to the phototube. The circuit of Fig. 5 is similar to that of Fig. 2, except that the polarity of the bias winding 14 is reversed, the connections to the cathode and anode of the phototube are reversed, and a resistor 30 which may have a value of 6.8 megohms is connected across the bias capacitor 27.

The in-phase bias voltage $E_b$ is positive during the positive half-cycles, and the bias voltage $E_c$ provided by the charge in the capacitor 27 when no light is supplied to the phototube 23, is negative during the positive half-cycles as illustrated by Fig. 6. The bias voltage $E_g$ at the control grid of the thyratron 15 is the sum of $E_b$ and $E_c$, and is sufficiently positive to cause the thyratron to conduct during the positive half-cycles.

Negative output voltage $E_v$ is supplied by the phototube during positive half-cycles of the thyratron anode voltage when light is applied to the phototube, which output voltage overcomes the grid bias voltage which normally causes the thyratron to conduct. To be most effective, this output voltage should be present at the beginnings of the positive half-cycles of the thyratron anode voltage, and should be maintained over substantially each positive half-cycle so as to prevent the thyratron from having a chance to conduct. This is accomplished by this invention. The phase-shifting of the phototube output voltage ahead of the thyratron anode voltage provides the negative voltage which prevents the thyratron from firing at the beginning of each positive half-cycle. The extension of the phototube output voltage in the other direction provides the negative voltage which prevents the thyratron from firing during the latter portions of the positive half-cycles.

The resistor 30 connected across the bias capacitor 27 permits the latter to discharge when light is removed from the phototube, its discharge time being short enough so that the thyratron will not be held off an excessively long time after the removal of light from the phototube, but long enough so that the charge on the thyratron control grid will not decay during the half-cycles during which it is applied.

While embodiments of the invention have been described for the purpose of illustration, it should be understood that the invention is not limited to the exact circuits and circuit components illustrated, since modifications thereof may be suggested by those skilled in the art, without departure from the essence of the invention.

I claim as my invention:

1. A phototube control circuit comprising a transformer having a pair of secondary windings, a grid-controlled electronic tube having an anode-cathode circuit connected to one of said windings, a capacitor and a resistor connected in a series, phase-shift circuit across the other of said windings, a bias connection from said other winding to the cathode of said tube, a phototube and a capacitor connected in a series circuit across said resistor, and a resistor connected to the junction point connection of said second mentioned capacitor and said phototube and to the control grid of said tube.

2. A phototube control circuit as claimed in claim 1 in which a resistor is connected across the second mentioned capacitor.

3. A phototube control circuit as claimed in claim 2 in which the bias connection comprises a potentiometer connected across said other winding, and having a brush connected to said cathode.

4. A phototube control circuit as claimed in claim 1 in which the bias connection comprises a potentiometer connected across said other winding, and having a brush connected to said cathode.

5. A phototube control circuit comprising a transformer having a pair of secondary windings, a grid-controlled electronic tube having an anode-cathode circuit connected to one of said windings, a gaseous phototube having an input circuit connected to the other of said windings, means in said last-mentioned circuit for phase-shifting the voltage from said other winding applied to said phototube ahead of the anode voltage of said electronic tube, an output circuit connecting said phototube to the control grid of said electronic tube, and means in said input and output circuits for extending the output voltage from said phototube forwardly so that it exists after its anode voltage has become zero at the ends of half-cycle voltages from said other winding.

6. A phototube control circuit comprising a gaseous phototube, a source of alternating current, a circuit connecting said source to the anode and cathode of said tube, means connected in said circuit for phase-shifting the voltage at said tube ahead of the voltage from said source, an output circuit connected to said phototube, and means in said circuits for causing the voltage therein to exist after the voltage from said source has become zero at the ends of half-cycles.

7. A phototube control circuit comprising a transformer having a pair of windings, a grid controlled, gaseous electronic tube having an anode-cathode circuit connected to one of said windings, a gaseous phototube having an input circuit connected to the other of said windings, means in said input circuit for phase-shifting the voltage supplied by said other winding to said phototube ahead of the anode voltage of said electronic tube, an output circuit connecting said phototube to the control grid of said electronic tube, and means in said input and output circuits for causing the output voltage from said phototube to exist after the voltage from said other winding has become zero at the ends of half-cycles.

References Cited in the file of this patent

UNITED STATES PATENTS

| | | |
|---|---|---|
| 1,947,189 | Cockrell | Feb. 13, 1934 |
| 2,012,821 | King | Aug. 27, 1935 |
| 2,036,286 | Long | Apr. 7, 1936 |